United States Patent [19]

Ito et al.

[11] 4,144,412

[45] Mar. 13, 1979

[54] METHOD OF ASSIGNING A RADIO CHANNEL TO A CALLING MOBILE BODY OF MOBILE COMMUNICATION SYSTEM AND RADIO CHANNEL ASSIGNING SYSTEM THEREFOR

[75] Inventors: Sadao Ito, Yokohama; Noriaki Yoshikawa, Yokosuka; Mitsuru Komura, Tokyo, all of Japan

[73] Assignee: Nippon Telegraph and Telephone Public Corporation, Tokyo, Japan

[21] Appl. No.: 760,124

[22] Filed: Jan. 17, 1977

[30] Foreign Application Priority Data

Jan. 19, 1976 [JP] Japan .................................. 51-4720

[51] Int. Cl.² ............................................ H04Q 7/04
[52] U.S. Cl. .................................. 179/2 EB; 325/55; 325/53
[58] Field of Search .................... 179/41 A; 343/208; 325/55, 53

[56] References Cited

U.S. PATENT DOCUMENTS

| | | | |
|---|---|---|---|
| 2,033,271 | 3/1936 | Aiken | 343/208 |
| 3,310,741 | 3/1967 | Uitermark et al. | 343/208 |
| 3,764,915 | 10/1973 | Cox et al. | 179/41 A |
| 3,898,390 | 8/1975 | Wells et al. | 179/41 A |

*Primary Examiner*—William C. Cooper
*Assistant Examiner*—Kenneth A. Chayt
*Attorney, Agent, or Firm*—Charles E. Pfund

[57] ABSTRACT

The service area of the system is divided into a plurality of overlapping radio zones and a mobile-system base station is installed in each zone. The mobile-system base stations are assigned with a common control channel and each station is assigned with a plurality of speech channels which are commonly controlled by the control channel. Where a mobile body originates a transmission, the intensities of signals received by respective stations which have resulted from a signal transmitted by the mobile body are compared so as to designate an idle speech channel of a station which has received a signal having the maximum intensity among mobile-system base stations including the idle speech channel.

17 Claims, 18 Drawing Figures

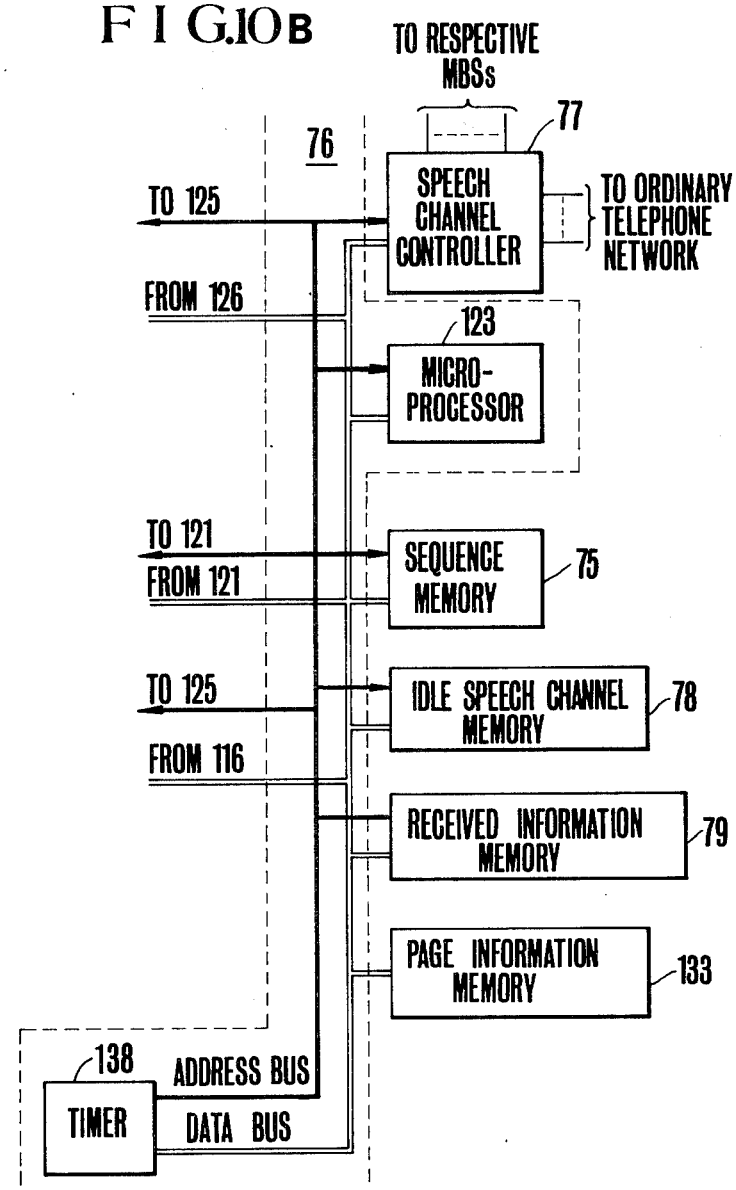

METHOD OF ASSIGNING A RADIO CHANNEL TO A CALLING MOBILE BODY OF MOBILE COMMUNICATION SYSTEM AND RADIO CHANNEL ASSIGNING SYSTEM THEREFOR

BACKGROUND OF THE INVENTION

This invention relates to a method of assigning a radio channel to a calling a mobile body of mobile communication system and a radio channel assigning system for the mobile communication system, and more particularly to a radio channel assigning method and system wherein a service area is divided into a plurality of radio zones which overlap with each other and a mobile-system base station is located in each radio zone and wherein a control channel and speech channels are assigned to each mobile-system base station (MBS) so as to effect common control thereof.

In recent years the requirement for communicating with such mobile bodies as motor cars, ships or portable telephone set, etc. by using ordinary telephone networks has been increasing, and many types of mobile communications systems have been developed to fulfil such requirement.

One example of such mobile communication systems is shown in FIG. 1 in which a service area is divided into a plurality of radio zones and a mobile-system base station equipped to transmit a particular electric wave frequency assigned thereto is located in each zone. The reason for using a control channel is that, where the system has a large capacity and a mobile communication service over a wide area is contemplated, the control efficiency is increased by commonly controlling a plurality of speech channels at a high speed thereby increasing the efficiency of utilizing the speech channels. Where the service area is divided into a plurality of small service areas and where mobile-system base stations are located in respective service areas, the base stations are not required to have large transmission power whereby it is possible to construct them as compact units. This arrangement permits repeated use of a frequency in different zones thereby enabling efficient use of a limited number of frequencies to increase the processing quantity of the traffic as compared to a system wherein the service area is not so divided.

In the example of the prior art radio channel assigning system for a mobile communication system shown in FIG. 1 the service area is divided into n small zones and mobile-system base stations $10_1$ through $10_n$ are located in respective zones. The electric wave transmitted from each station serves each zone. As can be noted from FIG. 1 adjacent zones overlap each other and to the ith mobile base station $10_i$ (where i = 1, ... n) are assigned a control channel $F_i$ (i = 1, ... n) and speech channels $f_{i1}, \ldots f_{im}$ where i = 1, ... n and m is an integer. In a vehicle, these channels are switched. In this manner, each mobile-system base station is normally transmitting control signals through a particular control channel assigned thereto.

Where a vehicle 12 in one service area of the system requests communication, the vehicle catches or selects a mobile-system base station from which it receives a signal wave having the maximum field strength or intensity among control channels corresponding to respective mobile-system base stations, for example station $10_1$, whereby the vehicle transmits a call or originating signal through a channel $F_1$ assigned to the mobile-system base station 12. Such channel selection or assignment is performed manually or automatically. The call signal transmitted by the vehicle 12 is received and relayed by only the mobile-system base station $10_1$ and transmitted to the mobile control unit 20 which operates according to the flow chart shown in FIG. 2. More particularly, upon receiving the call signal the processing advances from a start step 21 to a waiting step 22. Under these conditions, the mobile-system control unit 20 stores the idle and busy states of the speech channels of all mobile-system base stations $10_1$ through $10_n$. When the call or originating signal from the vehicle is received at this time (step 23 shown in FIG. 2), the mobile-system control unit 20 determines from which mobile base station the signal has originated based on the particular frequencies of the used control channels as shown by step 24 shown in FIG. 2. Then the processing is advanced to step 25 shown in FIG. 2 for checking whether there is an idle channel in the selected mobile base station or not. When there is an idle channel it is designated (step 26, shown in FIG. 2) and the information identifying the designated idle channel is transmitted through the mobile base station $10_1$ via the control channel $F_1$. The vehicle 12 receives the information regarding the idle speech channel and the designated idle speech channel is manually or automatically selected for communication, which includes the dial operation of an ordinary telephone set.

When the mobile control unit 20 selects an idle speech channel of the corresponding mobile base station $10_1$ upon receiving the call signal from the vehicle 12 through station $10_1$ and control channel $F_1$, there on occasion will be a case wherein the mobile base station is busy so that there is no available idle speech channel. At this time, processing proceeds from step 25 to step 27 to perform a call failure processing so as to connect the vehicle 12 to the mobile base station $10_1$ via the mobile control unit 20 thereby transmitting a signal indicating that the mobile base station is busy and no idle speech channel is available.

With this system, however, the probability of assigning the idle speech channel for a calling vehicle is determined by the capacity of the speech channel assigned to a mobile-system base station which receives a signal from a calling vehicle at the maximum field intensity. In order to increase the probability it is necessary to increase the number of speech channels assigned to each mobile-system base station. This requires a large expense of installation and presents the following problems. For example, in the service area shown in FIG. 1 there will be a case wherein a plurality of vehicles concentrate in the radio zone of the mobile-system station $10_1$ and consequently there is a small number of vehicles in the other zones. In such a case even when there is an idle speech channel in a mobile-system base station adjacent to the mobile-system base station $10_1$, as the control channels assigned to respective mobile-system base stations are different (for example, channel $F_2$ to station $10_2$ and channel $F_3$ to station $10_3$) even though there is an idle speech channel in the adjacent mobile-system base station the mobile-system control unit 20 can not designate the idle speech channel. In such a case the utilization efficiency of the channel is low.

SUMMARY OF THE INVENTION

Accordingly, it is an object of this invention to provide an improved method of assigning a radio channel to a calling a mobile body of mobile communication system.

Another object of this invention is to provide an improved radio channel assigning system for a mobile communication system that can improve the efficiency of utilization of the speech channels.

Another object of this invention is to provide a radio channel assigning system that can designate an idle speech channel even when a control channel which receives a calling signal at the maximum field is blocked by a system failure.

Still another object of this invention is to provide a novel radio channel for a mobile communication system that can designate an idle speech channel even when the speech channels of a mobile-system base station are busy.

A further object of this invention is to provide a novel radio channel assigning system for a mobile communication system capable of decreasing the number of call failures by increasing the efficiency of utilization of the speech channels without increasing the number of speech channels assigned to respective mobile-system base stations.

According to one aspect of this invention, there is provided a method of assigning a radio channel to a calling mobile body in a mobile communication system wherein the service area thereof is divided into a plurality of radio zones with adjacent zones overlapped with each other, said mobile communication system comprising a plurality of mobile-system base stations installed in respective radio zones, each of said mobile-system base stations including a control channel commonly assigned to respective mobile-system base stations, a plurality of speech channels and a mobile-system control unit for commonly controlling said speech channels by said control channel, said method comprising the steps of comparing the intensities of signal received by respective mobile-system base stations, said signal being transmitted from the mobile-system body, and designating as the radio channel to said calling body an idle speech channel in the mobile-system base station where said signal has been received with maximum intensity.

According to another aspect of this invention there is provided a radio channel assigning system wherein the service area thereof is divided into a plurality of radio zones with adjacent zones overlapped with each other, said radio channel assigning system comprising a plurality of mobile-system base stations installed in respective radio zones, each mobile-system base station including a control channel commonly assigned to respective mobile-system base stations, a plurality of speech channels and a mobile-system control unit for commonly controlling the speech channels by the control channel, said mobile-system control unit including means for comparing the intensities of signals received by respective mobile-system base stations which have resulted from a signal transmitted by a mobile body and means for designating an idle speech channel of a mobile-system base station which has received the signal having the maximum intensity among mobile-system base stations including an idle speech channel.

According to another aspect of this invention there is provided a radio channel assigning system of a mobile communication system wherein the service area thereof is divided into a plurality of radio zones with adjacent zones overlapped with each other, said radio channel assigning system comprising a plurality of mobile-system base stations installed in respective radio zones, each mobile-system base station including a control channel commonly assigned to respective mobile-system base stations, a plurality of speech channels, and a mobile-system control unit for commonly controlling the speech channels by the control channel, said mobile-system control unit including means for comparing the intensities of signals received by respective mobile-system base stations which have resulted from a signal transmitted by a mobile-system body, means for determining a mobile base station which has received a signal having the maximum intensity, means for designating an idle speech channel of the mobile-system base station thus determined, means for determining another mobile-system base station which has received a signal having an intensity next to the maximum where there is no available idle speech channel, and means for designating an idle speech channel of the another mobile-system base station.

According to still another aspect of this invention there is provided a radio channel assigning system of a mobile communication system wherein the service area thereof is divided into a plurality of radio zones with adjacent zones overlapped with each other, said radio channel assigning system comprising a plurality of mobile-system base stations installed in respective radio zones, each mobile-system base station including a control channel commonly assigned to respective mobile-system base regions, a plurality of speech channels, and a mobile-system control unit for commonly controlling the speech channels by the control channel, said mobile-system control unit including memory means for storing the intensities of signals received by respective mobile-system base stations which have resulted from a signal transmitted by a mobile body, means responsive to the informations stored in the memory means for sequentially searching the mobile-system base stations starting from a mobile-system base station which has received a signal having the maximum intensity until an idle speech channel is found.

BRIEF DESCRIPTION OF THE DRAWINGS

Further objects and advantages of the invention will be more fully understood from the following detailed description taken in conjunction with the accompanying drawings in which:

FIG. 11 is a time chart useful to explain the manner of preparing received information tables in the mobile-system control unit shown in FIG. 10.

DESCRIPTION OF THE PREFERRED EMBODIMENT

With reference to FIGS. 3 to 6, the basic principle of the novel radio channel assigning system of this invention for a mobile communication system will be described at first.

MOBILE COMMUNICATION SYSTEM

Figure 1:
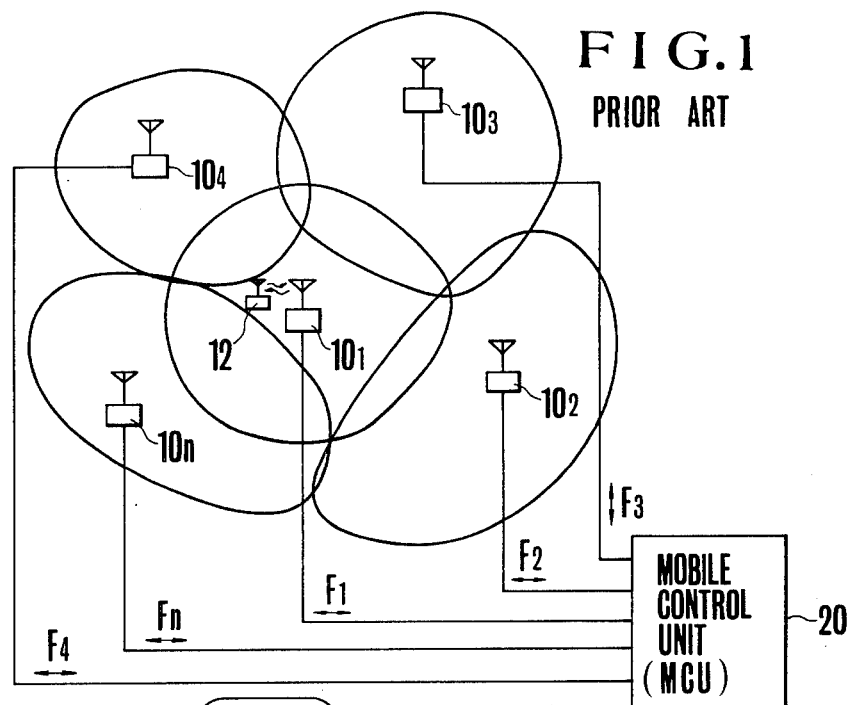
FIG. 1 is a diagram showing one example of the prior art radio channel assigning system for a mobile communication system.
Figure 2:
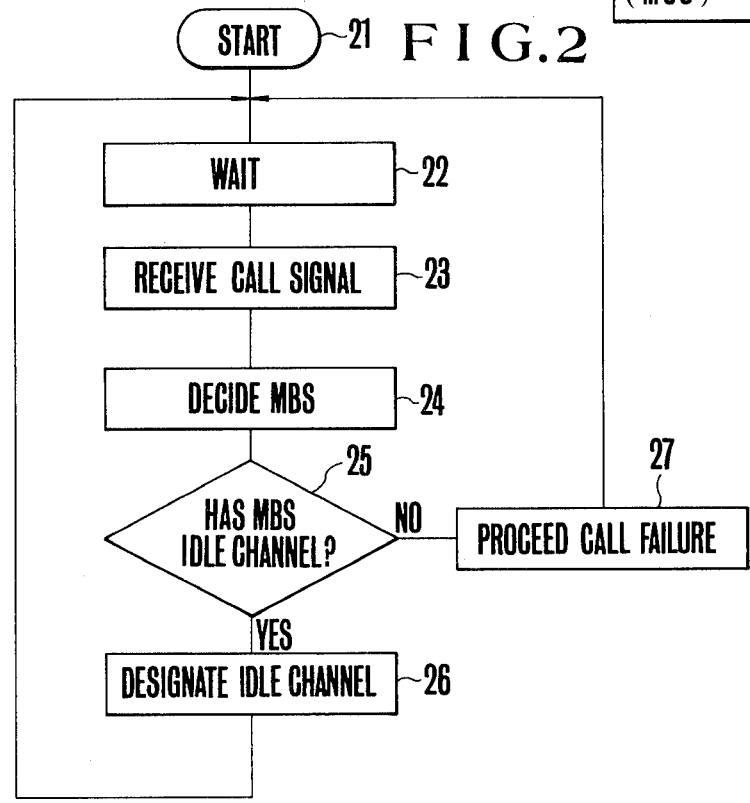
FIG. 2 is a flow chart for explaining the operation of a mobile-system control unit of the prior art system shown in FIG. 1.

In the system shown in FIG. 3, a service area is divided into n radio zones in which mobile-system base stations (hereinbelow sometimes referred to as mobile base stations) are located respectively. Each radio zone has an area of 5 kilometers in radius, for example. In this example, the number (n) of the divided zones is 4. Like the prior art system shown in FIG. 1, the ith mobile base station $40i$ (i = 1, ... n) is assigned with speech channels $f_{il}$ through $f_{im}$ (where m is an integer). The invention is characterized in that a control channel is commonly assigned to respective mobile base stations. It is assumed herein that a single control channel $F_1$ is commonly assigned to each mobile base station. The mobile base stations $40_1$ through $40_n$ are commonly controlled by a mobile-system control unit (hereinbelow sometimes referred to as mobile control unit) 44. A mobile body or subscriber's station, for example, a vehicle is designated by a reference numeral 42 and shown as located in the radio zone of the mobile base station $40_1$.

Figure 6:
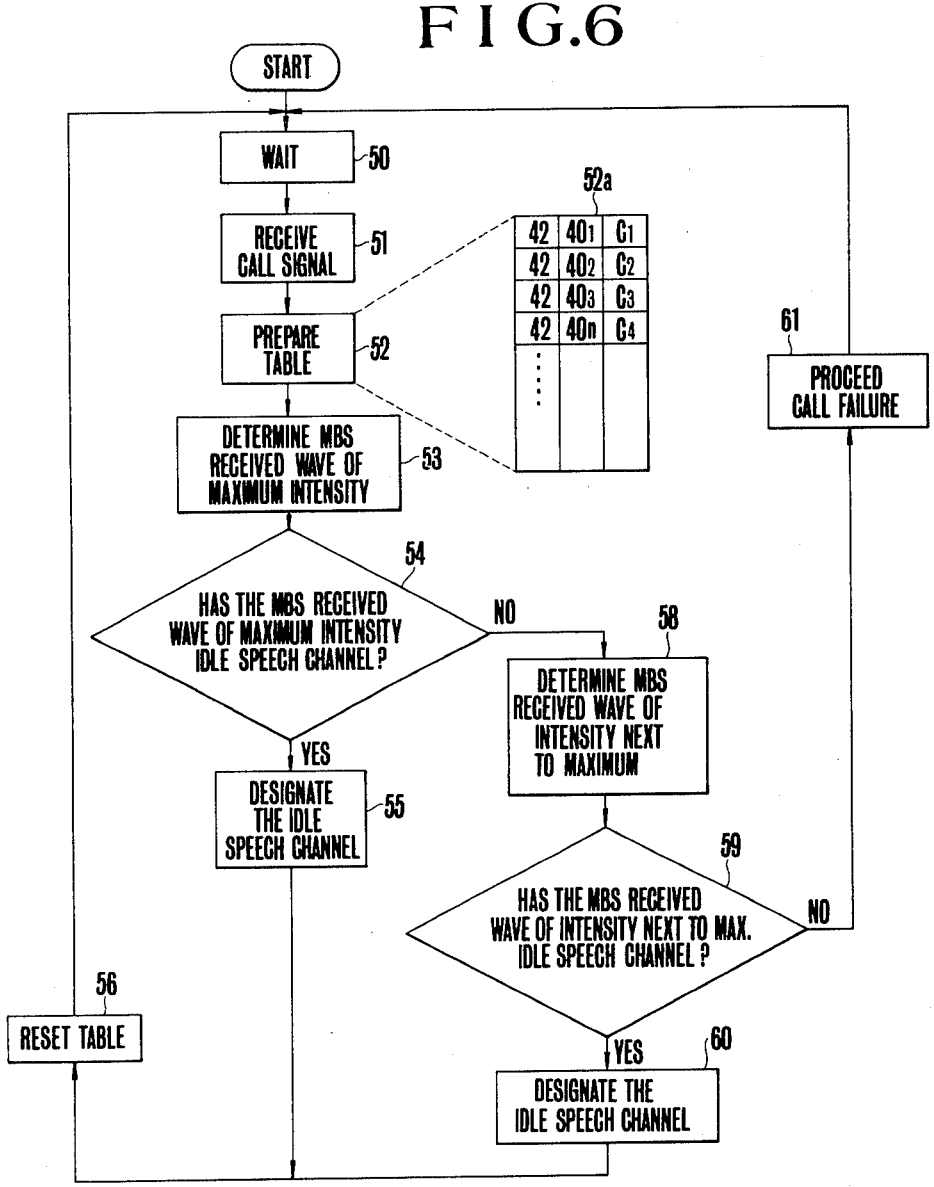
FIG. 6 is a flow chart showing the processing system of the mobile-system control unit shown in FIG. 5.

When the vehicle 42 calls or originates, a call signal is radiated through the control channel $F_1$. The call signal is received by all mobile base stations $40_1$ through $40_n$ because these stations are under the control of the common control channel. In each mobile base station, a signal representing the intensity of the received signal is added to the received signal and the sum of the received signal and said intensity level signal is sent to the mobile control unit 44 to be processed thereby according to a flow chart as shown in FIG. 6. More particularly, the radio control unit 44 is normally in a waiting state as shown by step 50 in FIG. 6 and when it receives the call signal from vehicle 42 (FIG. 6, step 51), a table 52a is prepared in which call signals from the vehicle 42 are arranged in accordance with their intensity (FIG. 6, step 52). The lefthand column of the table shows the identification number of the vehicle 42, the center column the number of the mobile base stations which have received the wave from the vehicle 42, and the right column the intensity $C_1$, $C_2$ ... of the wave.

When the table 52a is prepared, a particular mobile base station (in this example station $40_1$) which has received the wave of the maximum intensity is determined (FIG. 6, step 53) and in the next step 54, a search is made to determine whether there is an idle speech channel or not in that mobile base station. When there is an idle speech channel, this idle speech channel, for example channel $f_{11}$, is designated in step 55 whereby an information regarding the idle speech channel is transmitted from all mobile base stations through the control channel $F_1$.

When the vehicle 42 receives the signal regarding the designation of the idle speech channel the speech channel of the vehicle 42 is switched to channel $f_{11}$ thus communicating a speech. At the same time, the table 52 is reset in step 56 and the radio control unit 44 resets to the original waiting state (step 50).

If the result of the search for the idle speech channel of the mobile base station which has received the wave having the maximum intensity reveals that the station is busy and there is no available idle channel, another mobile base station which has received a signal wave having an intensity next to the maximum, in this example $40_3$, is determined from table 52a in step 58, so as to search whether the next determined station contains an idle speech channel or not. Where an idle speech channel is available, this channel is designated in step 60. Thereafter, the processing operation proceeds in the same manner as above described. If there is no idle speech channel in the mobile base station $40_3$ a call failure processing is performed in step 61.

Where there is no idle speech channel in the station which has received the wave having an intensity next to the maximum, without proceeding to the call failure processing, a mobile base station which has received the wave having a third intensity may be searched for designating its idle speech channel. The number of searches and designations to be repeated is determined in accordance with the intensity of the received wave, the degree of congestion of the communication and other conditions.

Where a radio zone is congested, a vehicle in that zone can be included in an adjacent radio zone by designating a speech channel of a radio zone which has received a wave having an intensity next to the maximum, with the result that the equivalent area of the congested zone is narrowed and that of the zones adjacent to the congested zone is widened such that the widening effect of the congested zone can be prevented. In FIG. 4, the zones in congested state are varied as shown by solid lines and the original zones identical to those shown in FIG. 3 are shown by dotted lines.

Accordingly, with the system of this invention, even when the speech channels of a mobile base station of a radio zone in which a calling vehicle is located are all busy it is possible to make a call by using an idle speech channel assigned to a not busy mobile base station in an adjacent zone thereby decreasing the number of call failures, increasing the quantity of traffic and improving the efficiency of utilization of the speech channels. In other words, the number of call failures can be reduced by improving the efficiency of utilization of the speech channels without increasing the number of the channels. Even when the quantity of the traffic of a vehicle varies with time such variation can be accommodated by using an idle channel assigned to a mobile base station adjacent the busy station.

Although the above description relates to the calling operation of a vehicle, a paging of the vehicle can be made in the same manner. More particularly, in a zone arrangement as shown in FIG. 3, where a paging is made to a vehicle, the radio control unit 44 operates to send a call signal of a vehicle from all mobile base stations through the common control channel $F_1$. When the vehicle 42 receives this signal, it radiates a page answer signal through the control channel $F_1$. When the mobile base stations $40_1$ through $40_n$ receive this signal from the vehicle, a signal representing the intensity of the received signal is added to the received signal and the sum of the received signal and said intensity level signal is transmitted to the radio control unit 44. The subsequent processing operations proceed in the same manner as those of the call.

In the paging where a mobile base station which has received the signal wave having the maximum intensity is congested, it is also possible to communicate by using an idle speech channel of an adjacent mobile base station thereby decreasing the probability of the page failure. The same advantages as in the case of a call can be obtained.

BASIC CONSTRUCTION OF A RADIO CONTROL UNIT

Figure 3:
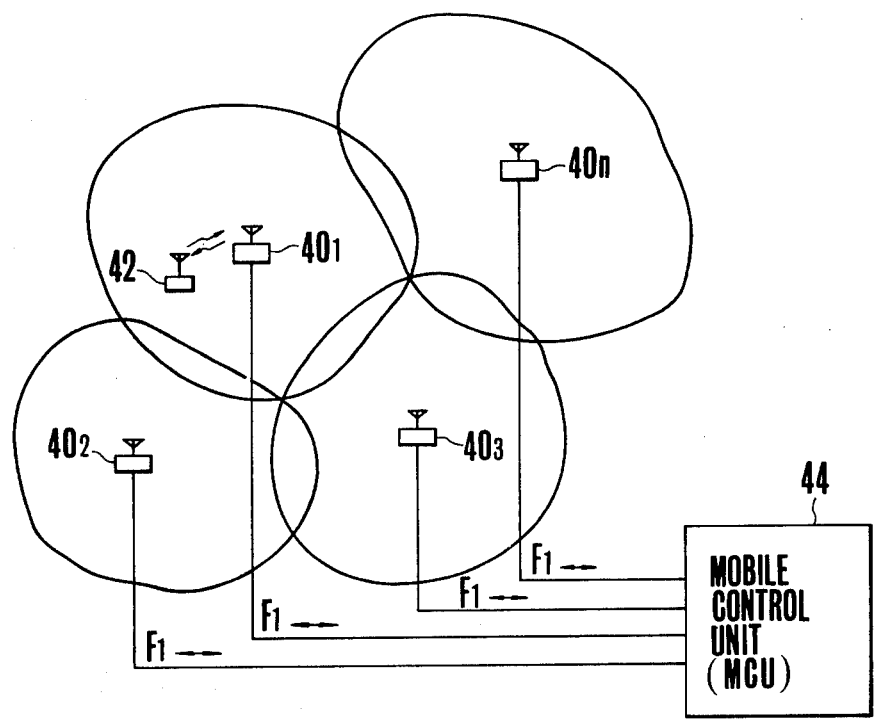
FIG. 3 is a diagrammatic representation showing the basic construction of the radio channel assigning system for a mobile communication system embodying the invention.
Figure 4:
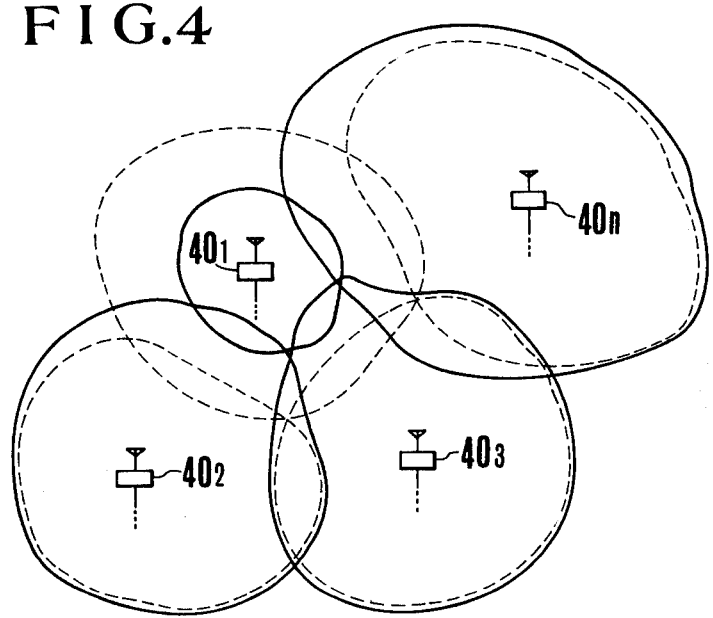
FIG. 4 is a diagram showing the relationship between equivalent radio zones obtained by the system shown in FIG. 3 and prior art radio zones.
Figure 5:
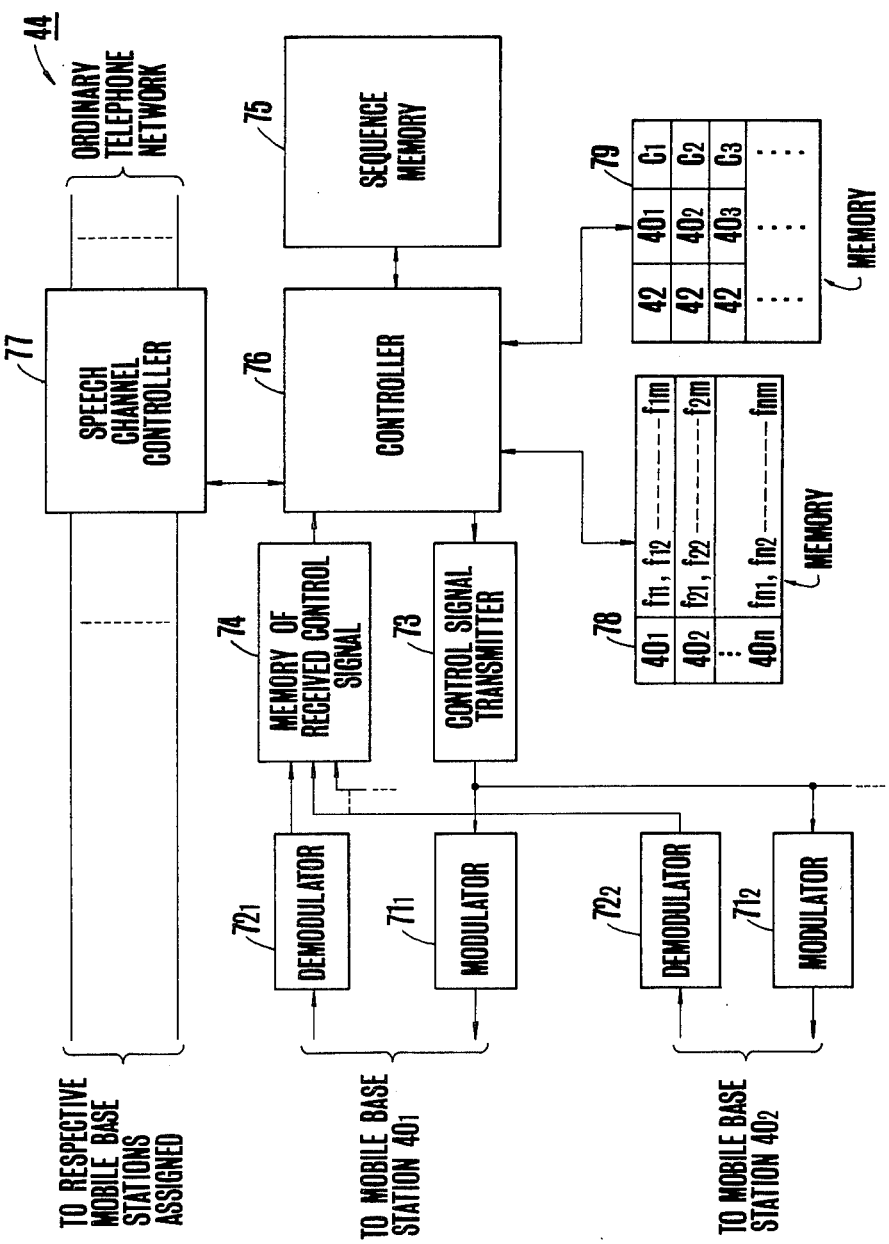
FIG. 5 is a block diagram showing the basic construction of the mobile-system control unit constructed in accordance with this invention.

FIG. 5 is a block diagram showing the basic construction of the radio control unit 44 shown in FIG. 3. As shown, the radio control unit 44 comprises modulators $71_1$, $71_2$ of the signals transmitted to respective mobile base stations, demodulators $72_1$, $72_2$ of the signals received from respective mobile base stations, a control signal transmitter 73, a memory device for storing the received control signal 74, a sequence memory device 75, a controller 76 which performs the preparation of the received information table in accordance with the contents of the memory devices 74 and 75, the transmission of the control signal, the storing of the received information, the determination of a mobile base station having the intensity of the maximum level in accordance with the flow chart shown in FIG. 6 and a speech channel controller 77 containing a bidirectional trunk for connecting respective speech channels to ordinary telephone networks. There are also provided a memory device 78 for storing idle speech channels and a memory device 79 for storing a received information table. In FIG. 5 the stored tables are shown diagrammatically. The received information table prepared in the memory device 79 includes the identification numbers of the calling vehicles, the identification numbers of the mobile base stations which have responded to the call and the intensities $C_1, C_2 \ldots$ of the received wave. The idle speech channel table prepared by the idle speech channel memory device 78 stores the idle speech channels of respective mobile base stations and such information is combined with the number of each mobile base station, the number of the speech channel assigned thereto and idle and busy states of the channel. The information regarding the idle speech channels is obtained from the speech channel controller 77 through the controller 76.

The call signals transmitted from the vehicle 42 and received by respective mobile base stations $40_1$ through $40_n$ are demodulated by respective demodulators of the mobile control unit 40 and stored temporarily in the received control signal memory device 74 which acts as a buffer memory device. The controller 76 prepares a received information table in accordance with the flow chart shown in FIG. 6 under the control of the program signals from the sequence memory device 75. The device 75 is generally constructed with a read only memory (ROM). Such a table is ordinally prepared by using a random access memory device (RAM), to select a mobile base station which has received a signal wave having the maximum intensity (in this example, station $40_1$) among received wave intensity information regarding the vehicle 42 and contained in the table prepared by the received information memory device 79. Then, the controller 76 determines an idle speech channel of the mobile base station $40_1$ which has received the signal wave having the maximum intensity based on the idle speech channel table 78, which can be prepared by using a RAM in the same manner as the received information table 79. The information regarding the idle speech channel thus determined is transmitted to all mobile base stations $40_1$ through $40_n$ by the control signal transmitter 73 through the common control channel $F_1$. Accordingly, respective mobile base stations simultaneously transmit idle speech channel designation signal to respective zones.

Where there is no idle speech channel the controller determines again a mobile base station, for example station $40_3$, which has received a signal wave having an intensity next to the maximum, and searches and designates its idle speech channel. If this station $40_3$ does not contain any idle speech channel a search and designation are made to find out an idle speech channel of a mobile base station which has received a signal wave having a third intensity. Thereafter, similar operations are repeated.

From the above description, the operation of the mobile control unit 44 for designating an idle speech channel can readily be understood.

In the following, respective elements will be described in more detail.

MOBILE-SYSTEM BASE STATION

Figure 7:
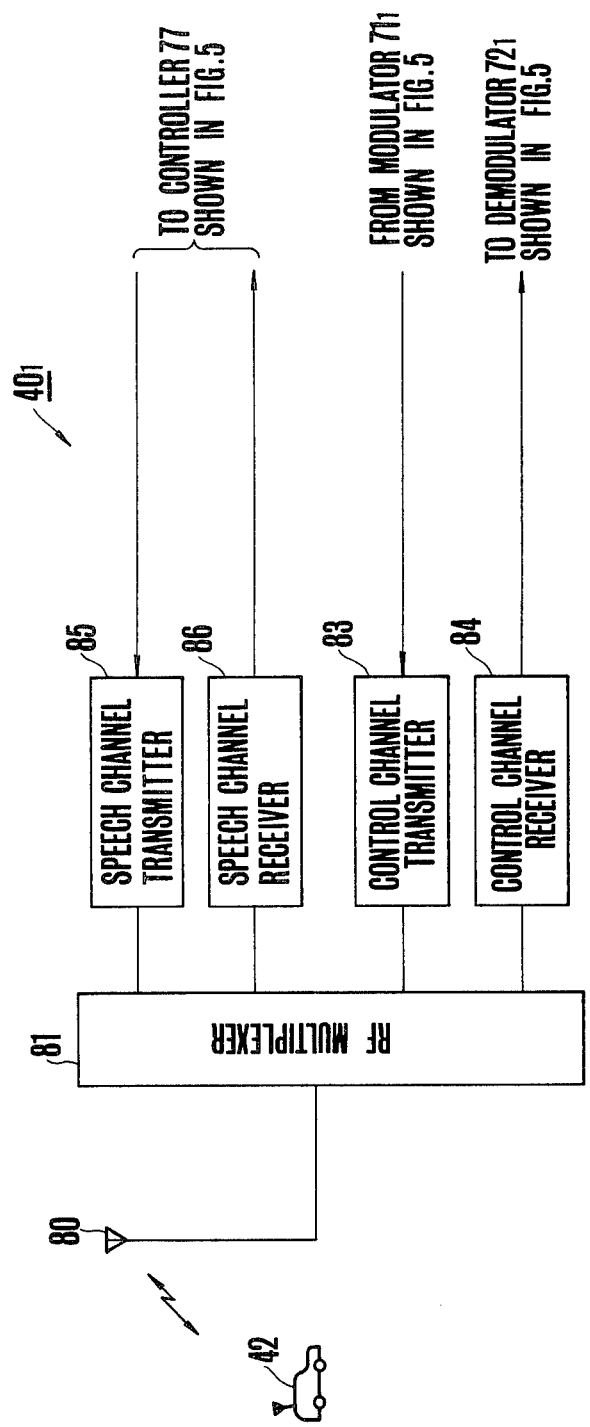
FIG. 7 is a block diagram showing the basic construction of a mobile-system base station.

FIG. 7 shows the basic construction of a mobile base station, more particularly the station $40_1$. The station $40_1$ comprises an antenna 80 for communicating electric waves with vehicle 42 and the antenna 80 is connected with a control channel transmitter 83, a control channel receiver 84, a speech channel transmitter 85 and a speech channel receiver 86 via an RF multiplexer 81.

The control channel transmitter 83 functions to receive a signal from the modulator $71_1$ of the mobile control unit 44 for transmitting a control information through the antenna 80. The control channel receiver 84 functions to transmit the control information of the vehicle 42 received by the antenna 80 to the demodulator $72_1$ shown in FIG. 5. The transmitter 85 and the receiver 86 of the speech channel function to transmit and receive the speech signal and are connected to the speech channel controller 77 shown in FIG. 5.

Figure 8:
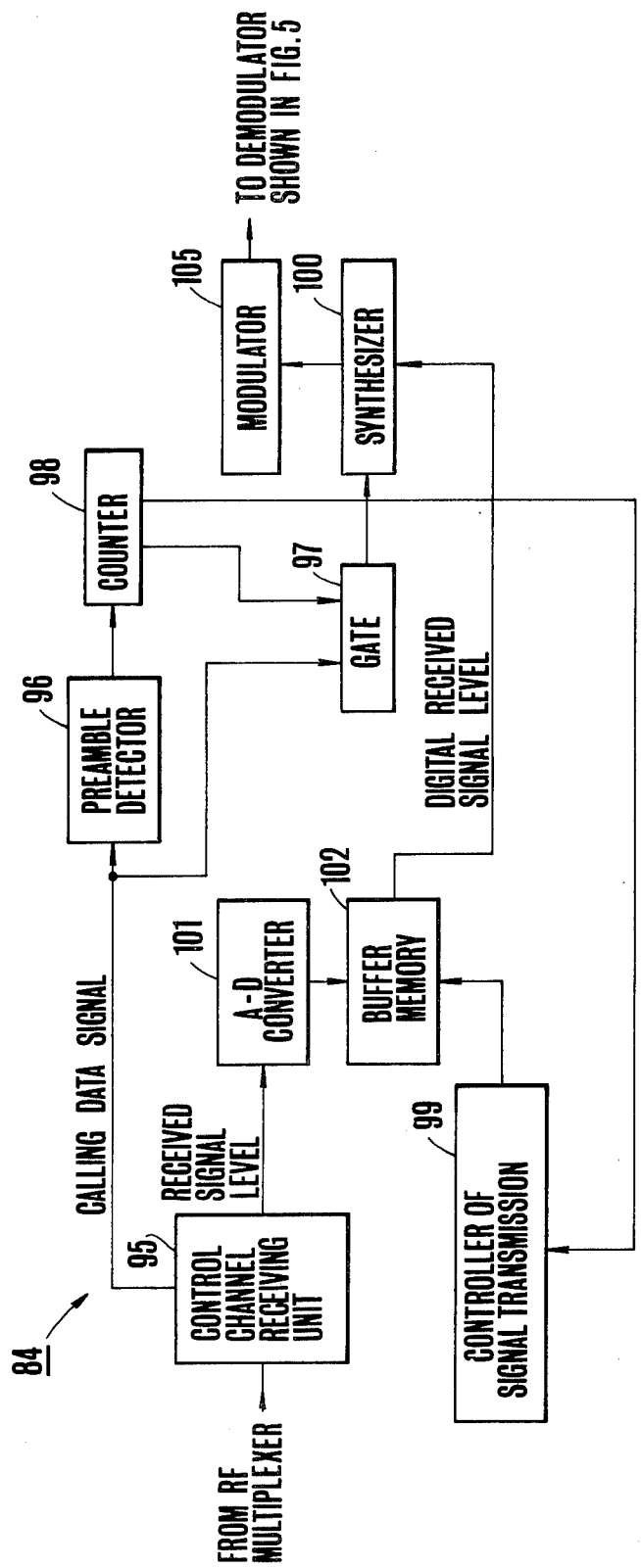
FIG. 8 is a block diagram showing one example of a control channel receiver.
Figure 9:
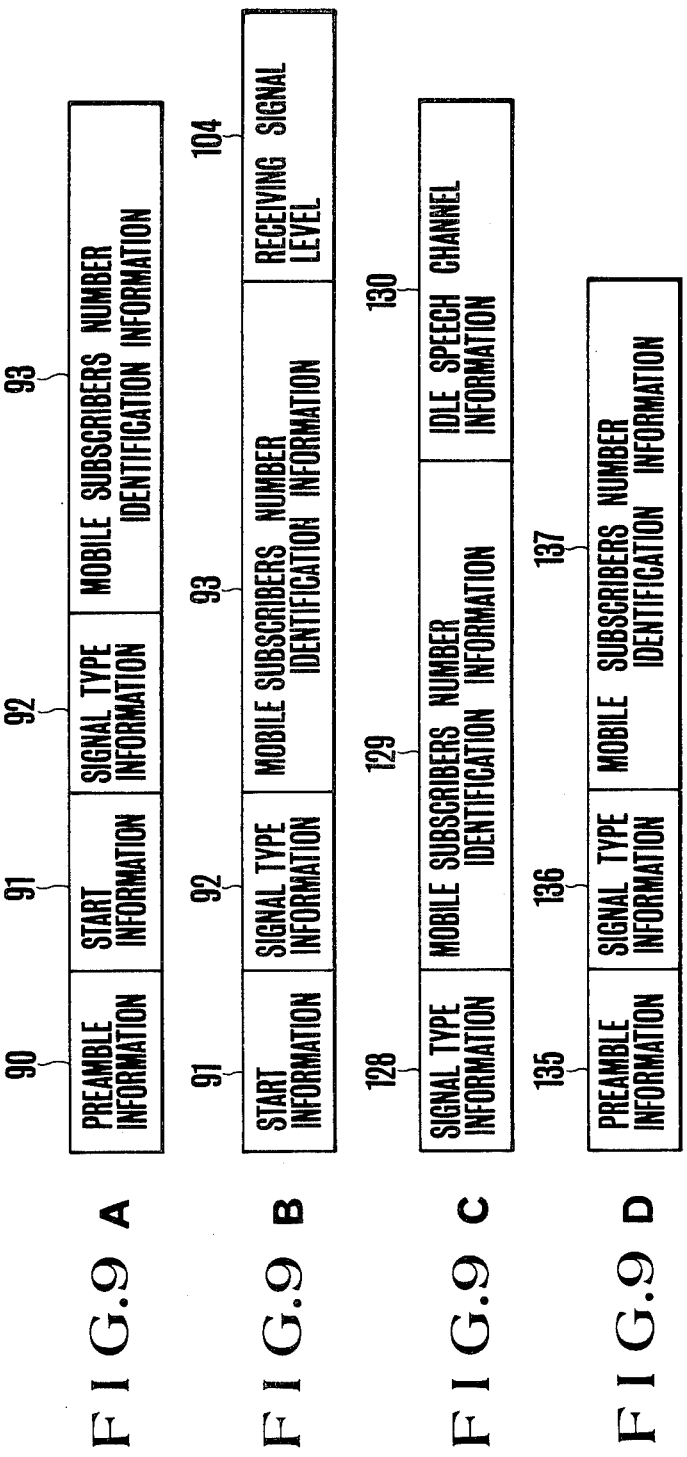
FIGS. 9A through 9D are diagrams showing the format of the control information utilized in the system of this invention.

FIG. 8 shows the construction of the control channel receiver 84 shown in FIG. 7. In this system a call data signal transmitted from the vehicle is a digital signal comprising a preamble information 90 consisting of several, for example 8 bits, a start information 91, a signal type information 92 consisting of a single bit, for example, and representing the type of the signal (whether the signal is a calling signal or a paging signal), and a mobile subscribers number identification information 93 consisting of 24 bits, for example, as shown in FIG. 9A.

When the call data signal having the construction described above is received by the antenna 80 of the mobile base station $40_1$ shown in FIG. 7, the signal is sent to the receiving unit 95 of the control channel receiver 84 via the RF multiplexer 81. The receiving unit 95 sends the data signal containing the preamble information 90 to a preamble detector 96 and a gate circuit 97. A counter 98 connected to the output of the preamble detector 96 sends to the gate circuit 97 a number of bits corresponding to those of the start information 91, signal type information 92 and the mobile subscribers number identification information 93. In response to the output from the counter 98, the gate circuit 97 is enabled for sending the start information 91, signal type information and the mobile subscribers number identification information 93 succeeding to the preamble information 90 to a synthesizer 100. This gate control is effected not to repeat to the MCU the noise created in the radio circuit. The purpose of the preamble information is to detect the signal from one vehicle and to prevent the other vehicles from transmitting signals thus preventing confusion of the signals. The time which elapses until the other vehicles stop transmission is called an idle-to-busy control time. The receiving unit 95 extracts a signal representing the level of the received signal in addition to the data signal described above. This signal represents the intensity of the signal wave received by the mobile base station $40_1$ from the vehicle 42 and is sent to an A-D converter 101. The A-D converter converts the analogue information regarding the received signal level into a digital signal consisting of 4 bits, for example. The digital signal is temporarily stored in a buffer memory device 102. When a timing signal produced by the signal transmission controller 99 in response to the output of the counter 98 is applied to the buffer memory device 102 it supplies the digital signal representing the received signal level to the synthesizer 100. The synthesizer combines the outputs from the gate circuit 97 and the buffer memory circuit 102 such that the digital signal representing the received signal level will be produced following the start information 91, the signal type information 92 and the mobile subscribers number identification information 93. FIG. 9B shows the output from the synthesizer 100, that is the data control information in which 104 represents the digital information regarding the received signal level. The output from the synthesizer is sent to the demodulator $72_1$ of the mobile control unit 44 via a modulator 105.

EXAMPLE OF THE MOBILE CONTROL UNIT

Figure 10:
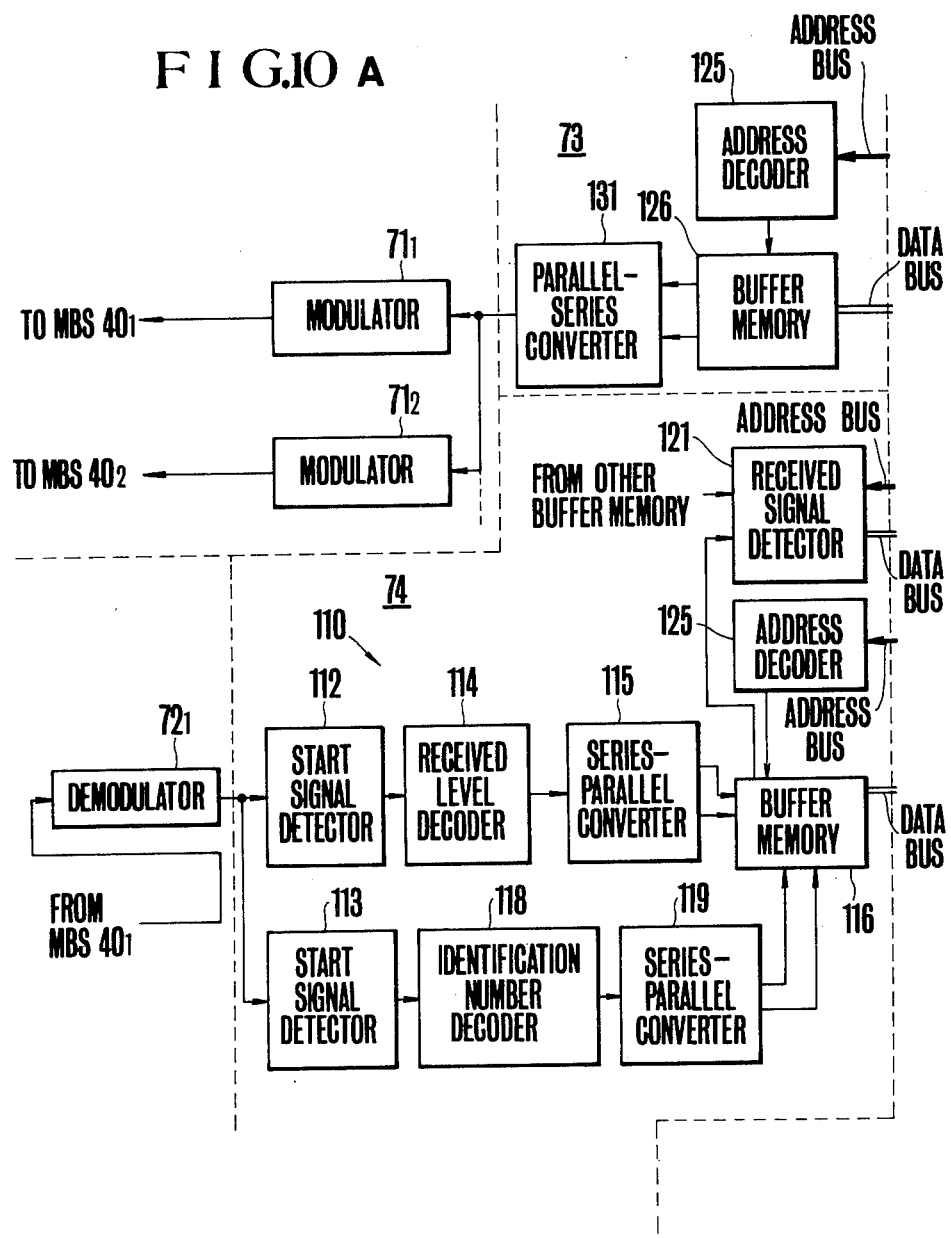
FIGS. 10A and 10B are block diagrams showing the detail of the radio control unit shown in FIG. 5.

FIGS. 10A and 10B show in more detail the mobile control unit 44 shown in FIG. 5. The unit 44 is constructed to receive the signal from the control channel receiver of a mobile base station shown in FIGS. 7 and 8 by a memory device 74 for storing the received control signal via demodulator $72_1$. The memory device 74 includes devices for independently processing the outputs from respective demodulators $72_1$, $72_2$ . . . Since these processing devices have the same construction, only a processing device 110 for processing the output of the demodulator $72_1$ is shown. The processing device 110 comprises first and second start signal detectors 112 and 113 which extract the start information 91 from the data control information demodulated by the demodulator $72_1$ and shown by FIG. 9B. When the start signal is detected, a received level decoder 114 connected to the output of the first start signal detector 112 decodes the received signal level information (shown by 104 in FIG. 9B) from the data control information in accordance with the start signal. The decoded received signal level information is applied to a series-parallel converter 115 and the output of this converter is stored in a buffer memory device 116. A decoder 118 for the mobile subscribers number identification information connected to the output of the second start signal detector 113 decodes the mobile subscribers number identification information (shown by 93 of FIG. 9B) from the data control information in accordance with the start information detected by the second start signal detector 113. The decoded identification information is converted into series-parallel form by a series-parallel converter 119 and the output thereof is stored in the buffer memory device 116 together with the received signal level information.

When the information described above is stored in the buffer memory device 116, it sends to a received signal detector 121 a signal representing that a call signal has been received from a vehicle. The purpose of this detector 121 is to detect a mobile base station that has received the call signal. From which mobile base station the detected signal was transmitted is determined by reading the output from the signal detector 121 by a microprocessor 123.

When the microprocessor 123 receives the signal from the received signal detector 121 it designates an address corresponding to the information stored in the buffer memory 116 corresponding to detector 121 by a corresponding address decoder 125 and this address information is sent to a received information memory device 79 via a data bus line together with the received signal level information and the mobile subscribers number identification information. This received information memory device 79 stores all information received from respective mobile base stations according to a predetermined sequence determined by the sequence memory device 75. The storing operation of the received information in the received information memory device 79 is performed in a specified time TmS (for example an idle-to-busy control time of 100 mS) thereby forming one received information table in each memory cycle.

FIG. 11 shows the relationship between the information received from respective mobile base stations and the time TmS. It will be clear that there is a time difference between the information signals received by different mobile base stations according to the distance between the mobile control unit and the mobile base stations. Accordingly, these received information signals are temporarily stored in buffer memory devices and then sent to the received information memory device 79 in accordance with the process timing of the microprocessor 123. Among the information sent to the received information memory device 79 and utilized to prepare a table are included the information signals sent from the other vehicles. However, such information signals are also processed similarly. On the other hand, where the distance between a vehicle and a mobile base station is large, it is impossible to receive the information during the specific time TmS. This condition is shown at the bottom of FIG. 11 and such information will be included in a table prepared by the next timing.

It is particularly to be noted that the received information written into the received information memory device from respective buffer memory devices is arranged in a table according to the order of the intensity of the received waves. For example, where the intensity of the received wave from the mobile base station $40_1$ is the strongest, the received signal information of this station is arranged at the top of the table followed by the information having the next intensity.

After determining the received information having the strongest intensity from the table of the received information memory device 79 in accordance with the output from the sequence memory device or ROM 75, the microprocessor 123 checks the content of the idle speech channel memory device 78 to determine whether there is an idle channel or not in the speech channel assigned to the mobile base station which has received the information. The content of the idle speech channel memory device 78 is prepared based on the information sent from the speech channel controller 77 as has been described in connection with the memory device 78 shown in FIG. 5. Where there is an idle speech channel the microprocessor 123 sends an address information to an address decoder 125 which constitutes a control information transmitter, in accordance with the outputs from the sequence memory device 75, thereby sending to the buffer memory device 126 over the data bus line the mobile subscribers number identification information of the vehicle which is stored in the received information memory device 79 and the idle speech channel information (for example $f_{11}$ of station $40_1$). In this case, the information stored in the buffer memory device 126 comprises the signal type information 128 consisting of a single bit, the mobile subscribers number identification information 129 and the idle speech channel information 130, as shown in FIG. 9C.

The idle speech channel information 129 selected in this manner is sent to the speech channel controller 77 thereby selecting a corresponding speech channel.

The content of the buffer memory device 126 is sent to a parallel-series converter 131 and the output thereof is sent to respective mobile base stations $40_1$ through $40_n$ via modulators $71_1$, $71_2$ ... to radiate electric waves by using the common control channel $F_1$. The phases of the waves radiated from respective mobile base stations are synchronized for matching the time of radiation.

When a vehicle receives the signal wave a speech condition is established by using the designated speech channel $f_{11}$. Succeeding operations are similar to the operation of the existing telephone system.

In the case of a paging, upon detection of a signal from a data circuit of the existing telephone network, the microprocessor 127 stores the paging information in a paging information memory device 133 through the speech channel controller 77 in accordance with the content of the sequence memory device 75. The paging information comprises a preamble information 135, a signal type information 136 and a mobile subscribers number identification information 137, as shown in FIG. 9D. The microprocessor of the mobile control unit 44 stores the information of the paging information memory device 133 in the buffer memory device 126. The content of the buffer memory device 126 is transmitted by all mobile base stations $40_1$ through $40_n$ via the parallel-series converter 131 and the modulators $71_1$ through $71_n$ by using the common control channel $F_1$. When the mobile base stations receive the response signal from a vehicle it adds a signal representing the intensity of the received signal to the response signal and the sum signal is transmitted to the mobile control unit 44. The subsequent operations are similar to the operations of the call. In FIG. 10B, 138 designates a timer.

Figure 12:
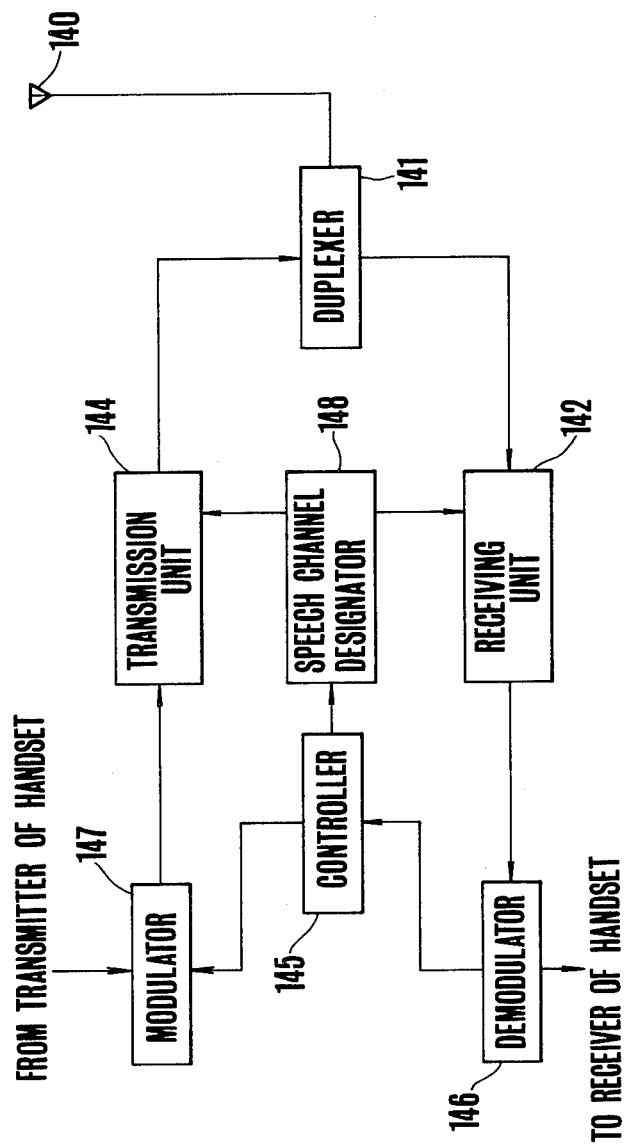
FIG. 12 is a block diagram showing the basic construction of a station utilized in a vehicle.

FIG. 12 shows the basic construction of the station in a vehicle. The electric wave received by an antenna 140 is sent to a receiving unit 142 via a duplexer 141 commonly used for reception and transmission. The signal transmitted by the vehicle is radiated by the antenna 140 from the transmission unit 144 via the duplexer 141. The output from the receiving unit 142 is sent to a demodulator 146. When a paging information as shown in FIG. 9D is received from a mobile base station via the control channel $F_1$, in response to the output from the demodulator 146 a controller 145 commences the paging operation of the mobile base station so as to judge whether the information sent to the demodulator 146 from the receiving unit 142 and demodulated by the demodulator is the information regarding the vehicle itself or not. If it is judged that the information (the identification number) is of the vehicle itself the response signal is radiated through the antenna 40 via modulator 47 transmission unit 144 and the duplexer 141. The modulator 147 modulates the response signal by the signal from a transmitter of a handset (not shown).

Where a speech channel designation signal is sent from a mobile base station in accordance with the response signal the received signal is sent to the speech channel designator 148 from the antenna 140 via the receiving unit 142, demodulator 146 and controller 145 so as to send a speech channel switching information to the transmission unit 144 thereby enabling communication through the designated speech channel. Thus, the switching between the transmission unit 144 and the receiving unit 142 is made to commence communication through the designated speech channel. Although not shown in FIG. 12, the modulator unit 147 is connected from a transmitter of a handset and the demodulator 146 is connected to a receiver of a handset. Further, a hook switch, a bell, a dial, etc. which are necessary for a telephone set are not shown in FIG. 12.

At the time of calling, a signal as shown in FIG. 9A is transmitted through the antenna 140 by using the control channel $F_1$. When a mobile base station designates a speech channel, the designated speech channel is selected by an operation similar to that of the paging and a calling or dialling operation is made in the same manner as an ordinary telephone set.

Figure 13:
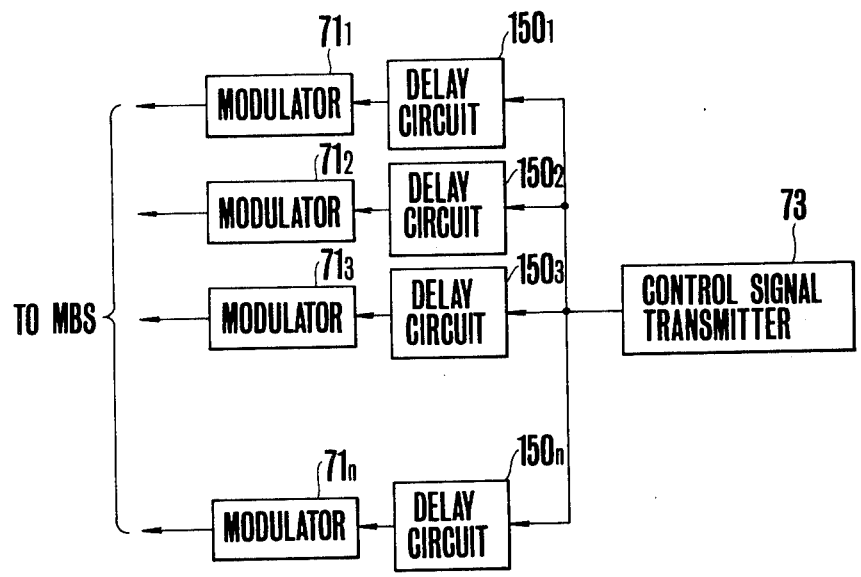
FIGS. 13 and 14 are block diagrams showing two examples of the circuits for sending a control signal from the control signal transmitter of the mobile control unit to the modulators corresponding to respective mobile base stations.
Figure 14:
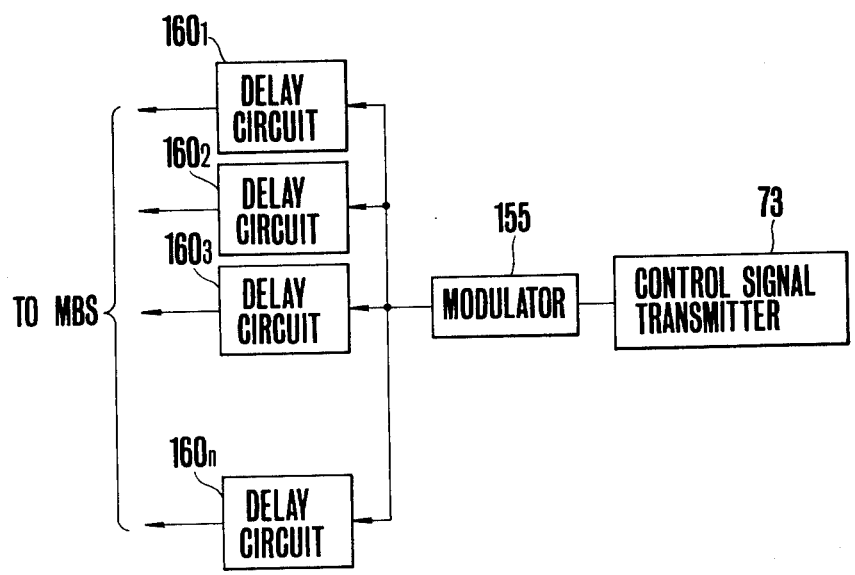

FIGS. 13 and 14 show two examples of the circuit for sending a control signal from the control signal transmitter of the mobile control unit to the modulators $71_1$–$71_n$ corresponding to respective mobile base stations. Since the distances between the mobile control unit and the mobile base stations are generally not equal, when the same signal is radiated by respective mobile base stations by using a common control channel it is impossible to simultaneously radiate the signal. In other words, there are phase differences between the signals radiated by different mobile base stations. The circuits shown in FIGS. 13 and 14 are constructed to eliminate this problem. In FIG. 13, delay circuits $150_1$ through $150_n$ are provided between the control signal transmitter 73 and respective modulators $71_1$ through $71_n$. The delay times of the delay circuits are made different such that the control signals radiated by respective mobile base stations will have the same phase. Of course, the delay circuits may be connected to the outputs of the modulators.

In the circuit shown in FIG. 14, a single common modulator 155 is connected between the control signal transmitter 73 and respective delay circuits $160_1$ through $160_n$ having the same construction as the delay circuits utilized in the circuit shown in FIG. 13.

Although the invention has been shown and described in terms of some preferred embodiments thereof it should be understood that the invention is by no means limited to these specific embodiments and that many changes and modifications are obvious to one skilled in the art without departing from the true spirit and scope of the invention as defined in the appended claims.

For example, although in the embodiments described above a single control channel $F_1$ was allocated to respective mobile base stations to act as a common control channel it is possible to allocate a plurality of control channels to respective mobile base stations for the purpose of increasing the versatility of the control channels.

Further, although in the foregoing embodiment a mobile base station which has received a signal having the maximum intensity from a vehicle was selected and then a search was made to determine whether there is an idle speech channel in that station or not, it is also possible to first select a station having an idle speech channel in response to a call of a vehicle and then search a station which has received a signal having the strongest intensity. In this case, when a station receiving a signal of the maximum intensity is selected an idle speech channel of that station is designated. These procedures are made in the same manner as in the foregoing embodiment.

Further, although in the foregoing embodiment the calling mobile body or calling mobile equipment is stated to be used for a vehicle, it can be also adapted to a portable telephone set.

What is claimed is:

1. A method of assigning a radio channel to a calling mobile body in a mobile communication system wherein the service area thereof is divided into a plurality of radio zones with adjacent zones overlapped with each other, said mobile communication system comprising a plurality of base stations installed initially to define respective radio zones, each of said base stations including a control channel commonly assigned to all base stations, a plurality of speech channels and a control unit for commonly controlling said speech channels by said control channel, said method comprising the steps of comparing the intensities of signal received by respective base stations, said signal being transmitted from the mobile body, and designating as the radio channel to said calling body an idle speech channel in the base station where said signal has been received with maximum intensity.

2. A radio channel assigning system of a mobile communication system wherein the service area thereof is divided into a plurality of radio zones with adjacent zones overlapped with each other, said radio channel assigning system comprising a plurality of base stations installed initially to define respective radio zones, each of said base stations including at least one control channel commonly assigned to all base stations, a plurality of speech channels and a control unit for commonly controlling said speech channels by at least one common control channel, said control unit including means for comparing the intensities of signals transmitted from a mobile body and received by respective base stations and means for designating an idle speech channel of a base station which has received the signal having the maximum intensity among base stations having an idle speech channel.

3. The radio channel assigning system according to claim 2 wherein said at least one control channel commonly assigned to respective base stations comprises a plurality of channels.

4. The radio channel assigning system according to claim 2 wherein said control unit further comprises selecting means for selecting, prior to operation of the designating means, base stations having idle speech channels in response to a call from a mobile body, the control unit thereby designating the idle speech channel of one base station which has received the signal having the strongest intensity among the base stations selected by the selecting means.

5. The radio channel assigning system according to claim 2 wherein each base station further comprises a transmitter and a receiver for use in the commonly assigned control channel and a transmitter and a receiver for use in a speech channel independently assigned to each base station.

6. The radio channel assigning system according to claim 5 wherein said receiver for use in the control channel comprises means for adding a signal representing the level of the signal received from the mobile body to the received signal.

7. The radio channel assigning system according to claim 6 wherein the signal transmitted from the mobile body and received by the receiver for use in the control channel comprises a signal type information followed by a mobile subscribers number identification information.

8. The radio channel assigning system according to claim 6 wherein said control unit further comprises a plurality of demodulators corresponding to respective mobile base stations for demodulating a signal transmitted from a body, control signal memory means for independently and temporarily storing the outputs from said demodulators, a received information memory device for storing the output from said memory means, and a controller for sending the output from said memory means to said received information memory device in accordance with a predetermined sequence.

9. The radio channel assigning system according to claim 8 wherein said controller prepares a table in said received information memory device in which the received informations from said memory means are arrayed in accordance with the intensity of the received signal.

10. The radio channel assigning system according to claim 6 wherein said control unit comprises means responsive to said signals added by said receivers in said base stations for determining a base station which has received a signal from the mobile body having the strongest intensity, means for searching for and designating an idle speech channel of the base station determined by said determining means, and means for radiating from said base stations an information regarding the designated idle speech channel by using said control channel common to respective base stations.

11. The radio channel assigning system according to claim 5 wherein the signal transmitted by said transmitter for use in the control channel comprises a signal type information, an identification information and a designated idle channel information which are combined serially.

12. The radio channel assigning system according to claim 9 wherein said control unit comprises an idle speech channel memory device for representing the idle and busy states of the speech channels, means for extracting an information regarding a base station which has received a signal having the strongest intensity from said table of the received information memory device, means for judging whether the extracted base station contains an idle speech channel or not in accordance with the content of said idle speech channel memory device and for sending an idle speech information signal to a control signal transmitter together with an information signal regarding the other base stations if an idle speech channel is available, and means for radiating said information signals by respective base stations through a modulator of said control signal transmitter by using the common control channel.

13. The radio channel assigning system according to claim 12 wherein said control unit includes a plurality of delay means which are constructed such that the signal waves radiated from respective base stations will have the same phase.

14. The radio channel assigning system according to claim 13 wherein said delay means are connected between a plurality of modulators and a control signal transmitter.

15. The radio channel assigning system according to claim 13 wherein said delay means are connected in series with respective transmission lines leading to respective base stations and connected to the output of a modulator for commonly modulating a signal sent to the base stations.

16. A radio channel assigning system of a mobile communication system wherein the service area thereof is divided into a plurality of radio zones with adjacent zones overlapped with each other, said radio channel assigning system comprising a plurality of base stations installed in respective ones of said plurality of radio zones, each of said base stations including a control channel commonly assigned to respective base stations, a plurality of speech channels, and a control unit for commonly controlling said speech channels by said control channel, said control unit including means for comparing the intensities of the signals transmitted from a mobile body and received by respective base stations, means for determining a base station which has received a signal having the maximum intensity, means for designating an idle speech channel of the base station thus determined, means for determining another base station which has received a signal having an intensity next to the maximum where there is no available idle speech channel in the first selected base station, and means for designating an idle speech channel of said another base station.

17. A radio channel assigning system of a mobile communication system wherein the service area thereof is divided into a plurality of radio zones with adjacent zones overlapped with each other, said radio channel assigning system comprising a plurality of base stations installed in respective radio zones including a control channel commonly assigned to respective base stations, a plurality of speech channels, and a control unit for commonly controlling said speech channels by said control channel, said control unit including memory means for storing data representative of intensities of signals transmitted by a mobile body and received by respective base stations, means responsive to the data stored in said memory means for sequentially searching said base stations starting from a station which has received a signal having the maximum intensity until an idle speech channel is found.

* * * * *